(12) United States Patent
Stuhlmann et al.

(10) Patent No.: US 9,643,745 B2
(45) Date of Patent: May 9, 2017

(54) DEVICE FOR FORMING MULTI-ROW PACKING UNITS

(71) Applicant: KHS GmbH, Dortmund (DE)

(72) Inventors: Christopher Stuhlmann, Korbach (DE); Ernst Van Wickeren, Weeze (DE); Volker Zahn, Volkmarsen (DE); Thomas Nitsch, Kleve (DE); Stefan Wagner, Xanten (DE)

(73) Assignee: KHS GmbH, Dortmund (DE)

( * ) Notice: Subject to any disclaimer, the term of this patent is extended or adjusted under 35 U.S.C. 154(b) by 315 days.

(21) Appl. No.: 14/361,980

(22) PCT Filed: Oct. 2, 2012

(86) PCT No.: PCT/EP2012/004190
§ 371 (c)(1),
(2) Date: May 30, 2014

(87) PCT Pub. No.: WO2013/079134
PCT Pub. Date: Jun. 6, 2013

(65) Prior Publication Data
US 2014/0318712 A1    Oct. 30, 2014

(30) Foreign Application Priority Data

Dec. 2, 2011    (DE) .................. 10 2011 119 968

(51) Int. Cl.
*B65G 47/00*    (2006.01)
*B65B 17/02*    (2006.01)
(Continued)

(52) U.S. Cl.
CPC .............. *B65B 17/02* (2013.01); *B65B 27/04* (2013.01); *B65B 35/44* (2013.01); *B65G 47/08* (2013.01); *Y10T 156/1744* (2015.01)

(58) Field of Classification Search
CPC ....... B65B 17/02; B65B 17/025; B65B 21/06; B65B 21/20; B65B 21/183; B65B 21/18;
(Continued)

(56) References Cited

U.S. PATENT DOCUMENTS

| 4,078,357 A | 3/1978 | Ida |
| 5,667,055 A | 9/1997 | Gambetti |

(Continued)

FOREIGN PATENT DOCUMENTS

| DE | 2331193 | 1/1975 | |
| DE | 3538119 A1 * | 4/1987 | ............. B65G 17/02 |

(Continued)

OTHER PUBLICATIONS

Machine translation of DE 3538119 date unknown.*

*Primary Examiner* — John Goff
(74) *Attorney, Agent, or Firm* — Occhiuti & Rohlicek LLP

(57) ABSTRACT

An apparatus for producing container packs from containers in a container stream or a plurality of transport lines includes guide elements, entraining elements, applicator elements, and a compartmentalizing and/or compressing unit configured for compartmentalizing and compressing a predetermined number of containers that are combined to form a container pack. The applicator elements apply an adhesive agent by spraying or sprinkling such that a bottle in the pack has adhesive a contact-or-touching surface thereof. The linear transporter transports containers that are to form a subsequent pack from an inlet to an outlet.

15 Claims, 3 Drawing Sheets

(51) Int. Cl.
*B65G 47/08* (2006.01)
*B65B 27/04* (2006.01)
*B65B 35/44* (2006.01)

(58) Field of Classification Search
CPC ......... B65B 27/04; B65B 35/14; B65B 35/16;
B65B 35/36; Y10T 156/1744; Y10T
156/1751; B65G 47/08; B65G 47/088
USPC ...... 53/48.1, 543, 247, 531, 443; 198/419.3,
198/426
See application file for complete search history.

(56) References Cited

U.S. PATENT DOCUMENTS

| | | | |
|---|---|---|---|
| 6,837,360 B2* | 1/2005 | Schoeneck | B65G 47/841 198/418.7 |
| 7,198,070 B1 | 4/2007 | Hansen et al. | |
| 7,726,464 B2 | 6/2010 | Cerf | |
| 2010/0308043 A1* | 12/2010 | Wimmer | B65B 17/02 220/23.4 |

FOREIGN PATENT DOCUMENTS

| | | |
|---|---|---|
| DE | 4126212 | 2/1993 |
| DE | 19604563 | 8/1997 |
| DE | 10163268 | 7/2003 |
| DE | 102006037105 | 2/2008 |
| DE | 2096039 | 9/2009 |
| DE | 102009025824 | 11/2010 |
| DE | 102009025912 | 12/2010 |
| DE | 102009044271 | 4/2011 |

\* cited by examiner

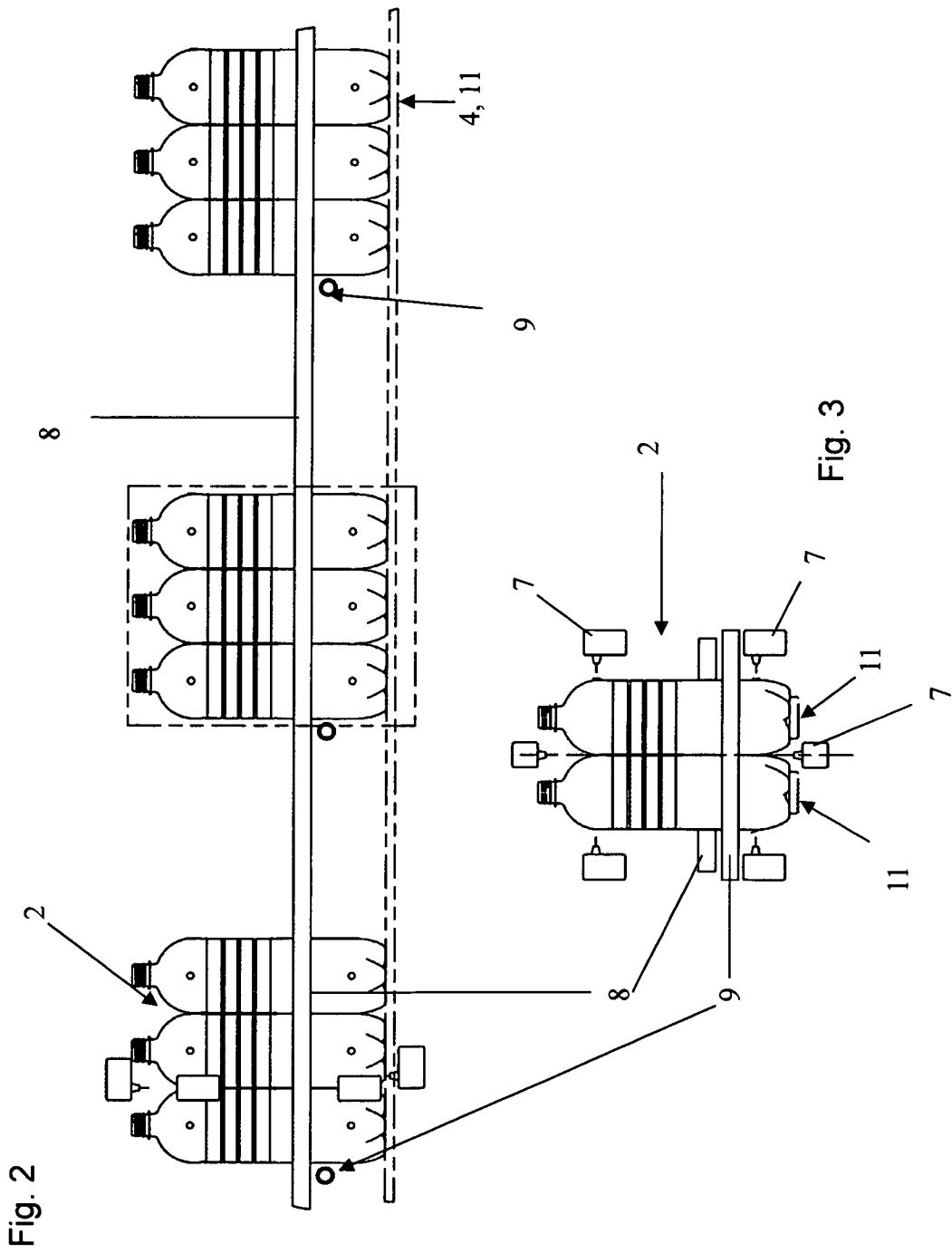

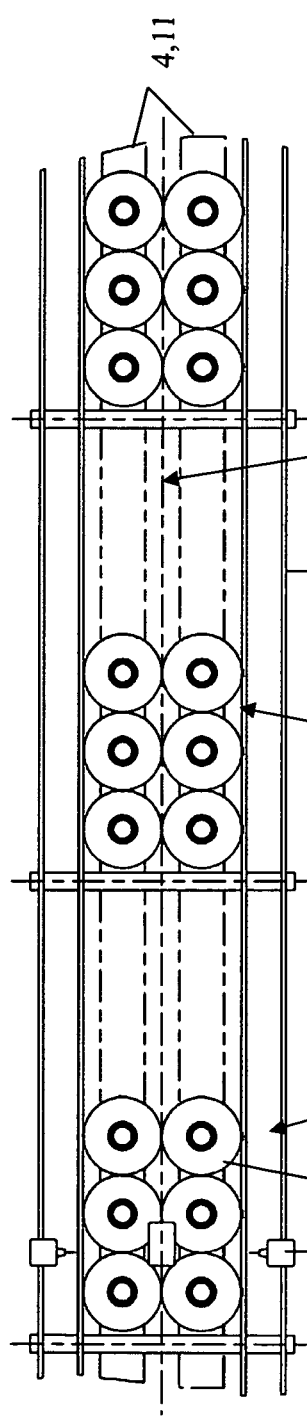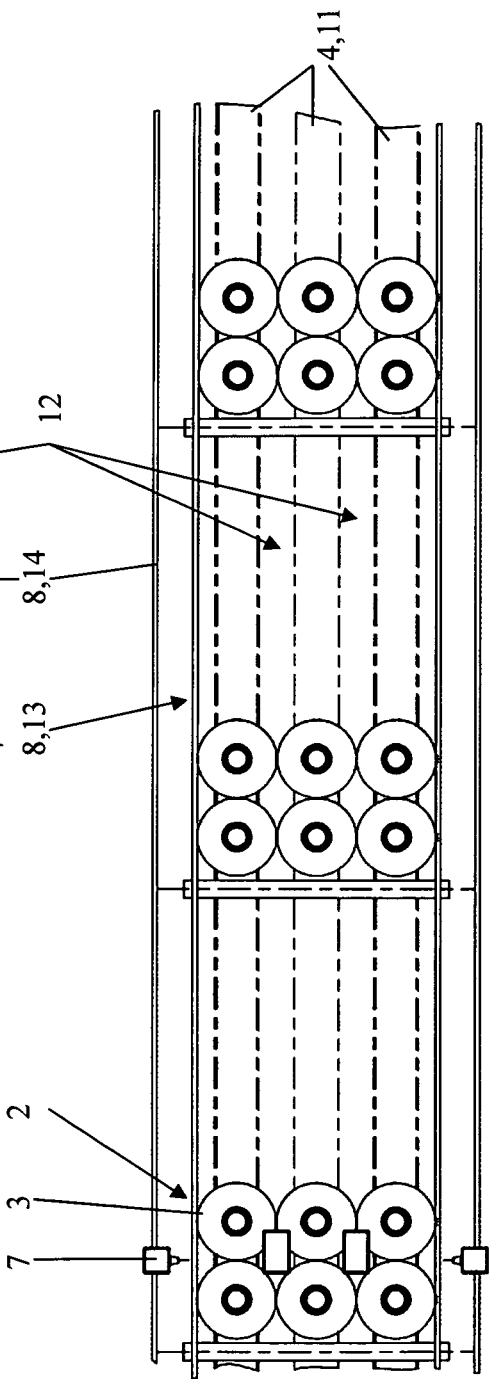
Fig. 4
Fig. 5

DEVICE FOR FORMING MULTI-ROW PACKING UNITS

RELATED APPLICATIONS

This application is the national stage of PCT application PCT/EP2012/004190, filed on Oct. 2, 2012, which claims the benefit of the Dec. 2, 2011 priority date of German application 10 2011 119 968.7, the contents of which are herein incorporated by reference.

FIELD OF INVENTION

The invention relates to container processing, and in particular, to making a packing unit, pack, or bundle from a stream of containers.

BACKGROUND

Containers, as described herein, include, for example, bottles, cans, tubes, pouches, being made from metal, glass and/or plastic. Such containers include PET bottles and other packaging elements, in particular those that are suitable for the filling of liquid or viscous products, and containers already combined into groups, i.e. multipack groups of containers.

Such containers often have a spherically arched contact region. Because of the shape of this contact region, containers can roll off against one another around a peripheral path, i.e. at a "roll-off ring." With glass bottles that have been used many times, this can be seen, for example, from the wear ring that is usually recognizable in bright accentuation. In the case of PET bottles such "roll-off rings" can be arranged not only in the head region but in the foot region also.

In detail, the production of the packs is effected e.g. in the manner that the containers are fed standing on a transport plane of a transporter and with their container axis oriented in vertical or essentially vertical direction in a bulk transport or in a wide container stream in which the containers are randomly oriented in regard to distinctive container features and/or configuration features. This wide container stream is then converted into a plurality of single-track container streams by lane division. The compartmentalizing of the containers that form the subsequent packs or their container groups from the single-track container streams, the bringing together of the necessary number of containers to form a compacted container group in which the containers lie against one another by a plurality of envelope or peripheral surfaces, i.e. by the contact or touching surfaces, and the connecting of the containers of each container group to form the compact and firm or stable pack, are carried out in further process steps.

The combining or forming of a plurality of articles into a group of articles and from the groups of articles to produce firm and/or transportable storage and transport units or packs using shrink films (e.g. U.S. Pat. No. 7,726,464) is known to the skilled person. One of the disadvantages of this is that the films used, and in particular the shrinking-on of the films by the application of heat or energy, causes considerable expense.

It has already been proposed to produce transportable packs by the containers that are formed to a container group being packed, i.e. connected together into a pack, by a strapping that encompasses the container group in the manner of a loop (DE 10 2009 025 824, DE 10 2009 044 271, DE 41 26 212), this constituting a particularly inexpensive and simple way of producing packs or transport and storage units. The strapping can also be bonded with the containers.

One disadvantage of the strapping, however, is that when one container is first removed from such a bundle, the strapping can no longer hold together the containers remaining in the bundle. This is the case not only when the strapping is removed or cut but also when a container is taken from the pack without severing the strapping.

Moreover transporting such packs on a belt conveyor presents the danger that cylindrical or chiefly cylindrical articles, such as cans, bottles or containers, assume a nesting position, i.e. slip into a gap in the adjacent row, due to vibration, impacts etc. With known packs, a very high tension must be applied to the strapping in order to avoid this.

DE 10 2006 037 105, on the other hand, relates to a method for the combining of bottle packets in which a rotary star wheel, which presses bottle necks into clips on flat carriers, is provided on both sides of a track. The bottle packet is also wrapped with a tape or an envelope (film).

According to DE 23 31 193, an adhesive is applied to containers in narrow surfaces or rows, with contiguous surfaces that are not provided with adhesive being intended to facilitate a gripping of the packing for carrying purposes. The containers stick to one another at the adhesive points. EP 2 096 039 also relates to containers being provided with an adhesive. However, a shrink film remains disposed around the bottle packet.

SUMMARY

The object of the invention is to provide a device for producing packs of the aforementioned type, whereby despite the lack of an enveloping film and/or despite the lack of strapping, the articles are always prevented, in a simple manner, from adopting a nesting position while being transported, and also prevented, even after one or more articles are removed from a pack the cohesion of the remaining articles in the pack is maintained and/or can be restored.

This object is achieved by at least one linear transporter on which a group of containers forming the subsequent pack can be transported from an inlet side in the direction of an outlet side, with applicator elements provided in the region of the linear transporter applying a liquid or free-flowing bonding or adhesive agent by spraying or sprinkling, and with static and/or movable guide elements being provided on either side of the linear transporter, and with entraining elements that are each assigned to a pack.

As used herein, "containers" includes bottles, cans, tubes, pouches, being made from metal, glass and/or plastic, including PET bottles, as well as other packaging elements, in particular those that are suitable for the filling of liquid or viscous products, and also containers already combined into container groups, with the containers in the container group being arranged in a non-nesting position.

As used herein, "adhesive agents" include all materials or masses that facilitate an adhesive bond between containers, in particular compounds, materials or masses that, when applied in the liquid or semi-liquid state, form a self-adhesive coat and/or bring about an adhesive bond under the application of pressure and/or energy and/or after curing or cross-linking, including through application of energy, multilayer materials, e.g. those comprising at least one carrier material that is coated with a material with which an adhesive bond between containers is possible, and that are therefore adhesively active on at least two sides.

An "adhesive" container has, in the sense of the invention, bonding agent or adhesive, or is provided with an application of bonding agent and adhesive. The bonding agent or adhesive is preferably selected such that the containers can be detached from a container bundle, group, or pack and/or separated from one another by hand and without damage.

To achieve the object of the invention, it is preferable that liquid adhesive be applied by the applicator elements. It is of particular advantage when a low-viscosity UV-curing adhesive is applied. A hot-melt adhesive would also be suitable. However, a hot-melt adhesive cools very rapidly and so could possibly lose its adhesive properties before the containers of the bundle are sufficiently bonded to one another.

A UV-curing adhesive is also beneficial due to the particularly easy setting of its desired properties. A corresponding curing station or curing section is expediently provided downstream of the applicator elements statically or along the linear transporter above or if necessary also below.

When seen in a transport direction the pack can be have a plurality of rows, i.e. for example two or three rows, with a corresponding number of container rows being arranged square to the transport direction. It is preferable if a pack has six containers, with either three containers being arranged one after the other in two rows or two containers arranged one after the other in three rows. It is possible for the linear transporter to have a support surface running square to the transport direction and that corresponds to the overall width of the container row.

In a preferred embodiment the linear transporter may have one transport surface for each container row. Thus the linear transporter may have two transport surfaces, for two container rows, or three transport surfaces, for three container rows, that, when seen square to the transport direction, are spaced apart from one another, i.e. each having a gap between one another. This is favorable for applying adhesive as shall be explained in more detail below. The linear transporter itself may be driven in order to convey the containers from the inlet side to the outlet side.

The applicator elements, which can be implemented as an applicator head or as a spray head, are provided to apply the preferably liquid, i.e. low viscosity, adhesive agent, preferably a UV-curing adhesive agent. It is beneficial if the applicator elements are arranged on an inlet side on a congruent center-line, i.e. in one line. In a preferred embodiment, a plurality of applicator elements, for example six or eight applicator elements are disposed such that each container is framed with adhesive on its contact-and-touching surfaces.

One, or depending on the number of container rows, two or more applicator elements are arranged beneath the linear transporter and apply the adhesive to the contact-and-touching surfaces of the containers from "underneath" through the aforementioned respective gap between the transport surfaces.

Applicator elements are also provided overhead, their number being preferably identical to the number of those positioned underneath. Further applicator elements are disposed to the side of the linear transporter. The applicator elements that are disposed on a common side are spaced apart from one another in the vertical direction of the containers, with one applicator element being arranged at the top end and the other at the bottom end. What is essential is that the applicator elements provide the contact-and-touching surfaces with liquid adhesive.

It is possible for the applicator elements to be mounted rigidly, i.e. immovably. In a further embodiment it is conceivable for the applicator elements to travel with the container pack at least along a partial section so as to then be returned to the initial position and to provide a new pack or its containers with adhesive on the contact-and-touching surfaces.

The guide elements may also be referred to as guide rails that guide or support the packs or the containers of the pack between them. It is conceivable for the guide elements to be rigidly mounted. It is however also possible for the guide elements to be travelling elements such that the containers and/or packs do not have a speed relative to a speed of the laterally disposed guide elements.

A lateral pressure for adhesively bonding the containers in the pack can be generated with the laterally disposed guide elements. The guide elements therefore not only have the function of guiding and supporting but also the function of generating a pressure acting on the containers that, when looked at square to the transport direction, compresses the containers or the pack, thus causing the containers to draw nearer to one another, pressing them against one another, and thereby causing an adequate adhesive bond.

In a preferred embodiment the entraining elements are arranged square to the transport direction and extend fully across the linear transporter, and when seen in transport direction are disposed behind the pack such that they push the pack along before them. This generates a force that assists an interconnection of the containers when seen in or against the transport direction, and/or a force that assists in compression.

To improve the bond between the containers of the pack when seen not only square to the transport direction but in the transport direction as well, the entraining elements can impart, to the containers, and/or impart to the pack, a speed acting relative to the transporter when seen in transport direction. If the conveying speed of the entraining element or elements is greater than the conveying speed of the linear transporter, the containers or the container pack will be pushed or slid the inlet side towards the outlet side. It is apparent that the pushing force can increase the adhesive bond considerably.

In a preferred embodiment the entraining elements can be configured as a bar, i.e. as an entraining bar. The entraining elements may also be themselves driven and/or be in connection with the guide elements. In addition to carrying out the foregoing functions, the guide elements can also assume the guiding function for the entraining elements.

If the guide elements are driven, i.e. if the guide elements can circulate, it is preferable to rigidly attach the entraining elements to the guide elements. In such a case, the above mentioned relative speed could be generated by the guide element drive.

The guide elements could also be adjustable in the transverse direction. This enables the device to be adjustable for different container dimensions. The conveying speed of the linear transporter, of the guide elements, and/or of the entraining elements can be individually adjusted. A suitable control center or central control unit of an overall installation can be used for this purpose.

It is possible also to provide the pack with a carrying element, for example a handle. Suitable devices may be provided downstream of the outlet side or at a suitable position on the linear transporter to add a carrying element. The carrying element can also be attached to the bundle with the afore-mentioned adhesive agent.

The invention therefore provides a device for producing a multi-row pack that, despite the lack of an enveloping film and/or despite the lack of strapping, prevents, in a simple manner, the containers from adopting a nesting position while being transported. Even after one or more containers are removed from a pac,k the cohesion of the remaining containers in the pack is maintained and/or can be restored.

Dispensing with a film or strapping band, i.e. making a filmless bottle pack, eases the burden on the environment by avoiding waste, and also saves resources used to produce the films or straps, both of which are usually made from plastic.

The containers of a bundle are aligned and stuck directly to one another while in transport, i.e. in the continuous operation of the device for producing packs, and/or of the packing machine.

It is also beneficial that the individual containers do not have to be rotated during application of adhesive. A filmless bottle pack can also be achieved with a minimum adhesive application that is just enough to provide an adequate bond between individual containers.

Further embodiments, advantages and possible applications of the invention arise out of the following description of embodiments and out of the figures. All of the described and/or pictorially represented attributes whether alone or in any desired combination are fundamentally the subject matter of the invention independently of their synopsis in the claims or a retroactive application thereof. The content of the claims is also made an integral part of the description.

BRIEF DESCRIPTION OF THE DRAWINGS

The invention is explained in detail below through the use of embodiment examples with reference to the figures. In the figures:

FIG. 2 shows, in side view, the partial section of FIG. 1, FIG. 3 shows a detail of the partial section of FIG. 1 to represent the applicator elements FIG. 4 shows, in plan view, the partial section of FIG. 1, and FIG. 5 shows, in plan view, a partial section of a device for producing a pack having six articles or containers in a row arrangement that is different from that depicted in FIG. 1.

In the different figures, the same reference character in each case identifies identical parts, which is why they are generally described only once. Bottles, cans, etc. are referred to generically as containers hereinafter.

DETAILED DESCRIPTION

Figure 1:
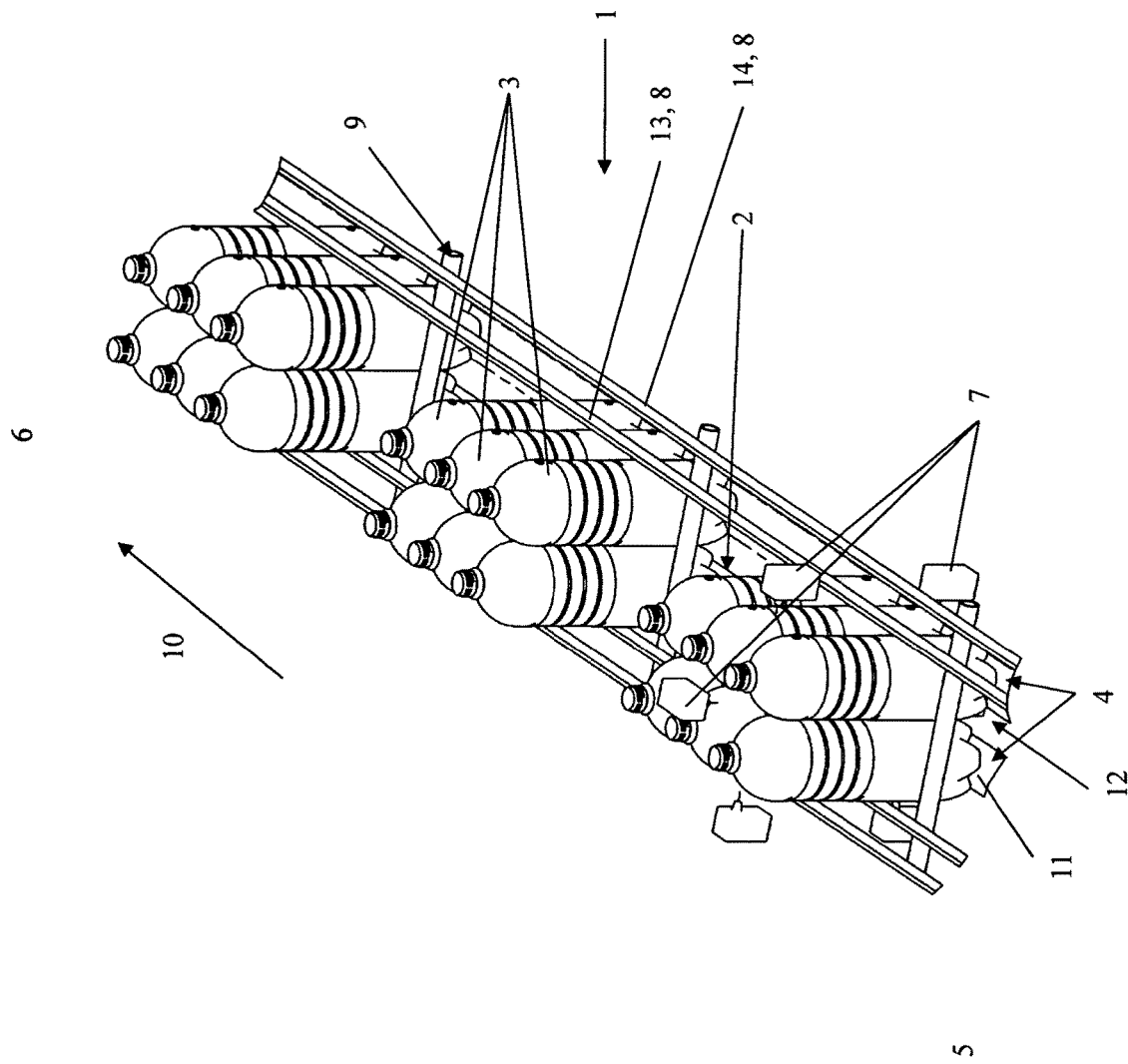
FIG. 1 shows, in perspective view, a partial section of a device for producing a pack having six articles or containers.

FIG. 1 shows a partial section of a device 1 for producing packs 2 of containers 3. The compressed or formed container groups are first formed by separating and bringing together a predetermined number of containers 3, for example six containers 3, from a container stream. While on the container stream, the containers 3 have an arbitrary orientation. This means, for example, that their container features and/or configuration features can be facing in any direction. When combined in a pack 2, at least one of containers 3 in the pack 2, and preferably each container 3, has bonding or adhesive agent applied on at least one contact-and-touching surface of the container. The contact-and-touching surfaces are clearly shown in the figures by the contact of containers 3 against one another. However, the contact-and-touching surfaces are not provided with a reference number.

A linear transporter 4 transports containers 3 or formed packs 2 from an inlet side 5 towards an outlet side 6. Applicator elements 7 are provided to apply bonding or adhesive agent at the inlet side of the transporter 4. Guide elements 8 are provided on either side of transporter 4. Entraining elements 9 are each assigned to a pack 2. An arrow 10 indicates a transport direction from the inlet side 5 towards the outlet side 6.

When seen in transport direction 10, a pack 2 can be configured to have a plurality of rows, i.e. for example two rows, as shown in FIG. 4, or three rows, as shown in FIG. 5, with a corresponding number of container rows each being disposed square to transport direction 10.

It is possible for linear transporter 4 to have a support surface that extends square to transport direction 10 and that corresponds to the total width of the container row concerned.

In a preferred embodiment, linear transporter 4 comprises a transport surface 11 for each container row concerned. The linear transporter 4 may thus have two transport surfaces 11, as shown in FIG. 4, or three transport surfaces 11, as shown in FIG. 5. When looking square to the transport direction 10, these transport surfaces 11 are spaced apart from one another, i.e. they have gaps 12 between each other.

The linear transporter 4 itself can be driven so as to convey containers 3 from inlet side 5 to outlet side 6.

Applicator elements 7, which are implemented as applicator heads or spray heads, are provided to apply the adhesive agent. The adhesive agent is preferably liquid, i.e. it is preferably a low viscosity adhesive agent. A preferred adhesive agent is a UV-curing adhesive. It is beneficial if applicator elements 7 are provided which at the inlet side are disposed on congruent center-line, i.e. on a line as can best be seen in FIG. 3.

In a preferred embodiment a plurality of applicator elements 7 are provided which can be disposed in such a way that each container 3 is framed with adhesive on its contact-and-touching surfaces. It is advantageous if each gap 12 also has an applicator element 7. FIG. 4 shows six such applicator elements and FIG. 5 shows eight, of which half are hidden.

One, or depending on the number of container rows, two or even more applicator elements 7 are disposed beneath the linear transporter 4. These applicator elements 7 apply the adhesive to the contact-and-touching surfaces of containers 3 from underneath through the gaps 12 between transport surfaces 11. Applicator elements 7 are also provided overhead. The number of such overhead applicator elements 7 is preferably identical to the number of applicator elements 7 positioned underneath. Further applicator elements 7 are provided to the side of linear transporter 4. Applicator elements 7 that are disposed on a common side are spaced apart from one another in the vertical direction of the containers 2, with one applicator element 7 being arranged at the top end of the container and the other at the bottom end of the container.

In the case of the embodiment depicted in FIG. 4, one applicator element 7 is provided above and another is provided below. In the case of the embodiment depicted in FIG. 5, two applicator elements 7 are provided above and two are provided below. The number of applicator elements 7 can be varied in the same way for a different number of rows or arrangement.

In the depicted embodiment, applicator elements 7 are disposed rigidly, that is, immovably on the device 1. In a further embodiment, it is conceivable for applicator elements 7 to travel with a pack 2 in common or singly at least along a partial section, after which the applicator elements 7 are returned to the initial position so that they can provide a new pack 2 or its containers 3 with adhesive at their contact surfaces.

Guide elements 8 may also be referred to as guide rails that guide or support packs 2 or containers 3 of a pack 2 between them. It is conceivable for guide elements 8 to be rigidly mounted. It is, however, also possible for guide elements 8 to be configured as travelling elements such that containers 3 or packs 2 have no, or an adjustable, speed relative to linear transporter 4. A lateral pressure for compression or adhesively bonding containers 3 of a pack 2 can be generated with laterally disposed guide elements 8.

In other words, guide elements 8 not only have the function of guiding and supporting but also the function of generating a pressure acting on containers 3 which when looked at square to transport direction 10 compresses the containers 3 of a pack 2 and/or draws them nearer to each other, pressing them against one another so as to cause an adequate adhesive bond.

Guide elements 8 that are arranged on either side can be configured as single elements disposed parallel with the linear transporter 4 or as vertically arranged panels. As can be seen from FIG. 1 in conjunction with FIG. 2, a guide element 8 can also be executed with an inner element 13 that is disposed parallel with an outer element 14, it being possible to provide end connections each between inner and outer elements 13 and 14.

In a preferred embodiment, entraining elements 9 are arranged square to the transport direction 10 and fully extend across the linear transporter 4. The entraining elements 9, when seen in transport direction 10, are arranged behind the pack 2 so that entraining elements 9 push the pack 2 along before them. This generates a force that assists an interconnection of the containers when seen in or against transport direction 10, and/or a compression thereof.

In order to improve the bond of containers 3 of pack 2 among one another not only square to transport direction 10 but also in (or against) transport direction 10, entraining elements 9 can impart to containers 3 and/or pack 2 a speed acting relative to linear transporter 4 when seen in transport direction. If the conveying speed of the entraining element or elements 9 is greater than the conveying speed of linear transporter 4, this brings about a pushing or sliding of containers 3 and/or of pack 2 from inlet side 5 towards outlet side 6.

Entraining elements 9 may, in a preferred embodiment, be configured as a bar, preferably as a round bar (FIGS. 1 and 2), i.e. as an entraining bar. The entraining elements 9 may also be themselves driven and/or be in connection with guide elements 8. If the entraining elements 9 are driven, they may glide or roll along on guide elements 8 with gliding or rolling means. Entraining elements 9 may be interconnected by way of pulling means (rope, chain, toothed belt or similar) so as to form continuous entraining elements 9.

If guide elements 8 are driven, i.e. are provided to circulate, it is very much in the interest of the invention to rigidly attach the entraining elements 9 to the guide elements 8, in which case the above mentioned relative speed could be generated by means of the guide element drive.

REFERENCE LIST

1 Device for producing packs
2 Bundle
3 Container
4 Linear transporter
5 Entry end
6 Discharge end
7 Applicator element
8 Guide element
9 Entraining element
10 Transport direction
11 Transport surface
12 Gap
13 Inner element of 8
14 Outer element of 8

The invention claimed is:

1. An apparatus for producing container packs from containers in a container stream or a plurality of transport lines, said apparatus comprising a linear transporter, entraining elements, applicator elements, and a compartmentalizing and/or compressing unit comprising guide elements, wherein said compartmentalizing and/or compressing unit is configured for compartmentalizing and/or compressing a predetermined number of containers that are combined to form a container pack, wherein said applicator elements are configured to apply an adhesive such that at least one container in said container pack has an application of adhesive at least on a contact-or-touching surface thereof, wherein said linear transporter is configured to transport a group of containers that are to form a subsequent pack from an inlet side to an outlet side, wherein said applicator elements are configured for applying at least one of a liquid and free-flowing adhesive by a technique selected from the group consisting of spraying and sprinkling, wherein said applicator elements are provided in a region of said linear transporter, wherein said guide elements are each provided at a side of said linear transporter, and wherein said entraining elements are each assigned to a pack, wherein said guide elements are further configured to cause containers to draw nearer to one another, thereby promoting an extent of an adhesive bond between said containers, and wherein said applicator elements comprise applicator elements that are disposed above said linear transporter, below said linear transporter, and on a side of said linear transporter, wherein said applicator elements on said side are vertically offset from each other.

2. The apparatus of claim 1, wherein said applicator elements are configured to move in a direction along said linear transporter while applying an adhesive to said pack.

3. The apparatus of claim 1, wherein said guide elements comprise static guide elements.

4. The apparatus of claim 1, wherein said guide elements comprise movable guide elements.

5. The apparatus of claim 1, wherein said linear transporter comprises a plurality of transport surfaces on which said containers stand arranged in rows, wherein said plurality of transport surfaces comprises a first transport surface and a second transport surface, wherein said first and second transport surfaces are adjacent to each other, and wherein a gap is disposed between said first and second transport surfaces.

6. The apparatus of claim 1, wherein said applicator elements are configured to apply an adhesive to a contact-and-touching surface that is arranged on a head-end roll-off ring.

7. The apparatus of claim 1, wherein said applicator elements are configured to apply an adhesive to it contact-and-touching surface that is arranged on a foot-end roll-off ring.

8. The apparatus of claim 1, wherein said guide elements are configured to be travelling.

9. The apparatus of claim 1, wherein said guide elements are configured to be rigid.

10. The apparatus of claim 1, wherein said guide elements are configured to laterally guide said pack.

11. The apparatus of claim 1, wherein said guide elements are configured to compress said pack.

12. The apparatus of claim 1, wherein said guide elements are configured to impart a transverse force to said pack.

13. The apparatus of claim 1, wherein said entraining elements are connected to said guide elements.

14. The apparatus of claim 1, wherein said entraining elements are rigidly attached to said guide elements, and wherein said entraining elements push said packs.

15. The apparatus of claim 1, wherein a first one of said entraining elements is assigned to a first pack and a second one of said entraining elements is assigned to a second pack.

* * * * *